United States Patent [19]

Sakai

[11] Patent Number: 4,846,765
[45] Date of Patent: Jul. 11, 1989

[54] SYSTEM FOR CONTROLLING THE PRESSURE OF OIL FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 198,392

[22] Filed: May 24, 1988

[30] Foreign Application Priority Data

May 28, 1987 [JP] Japan .................................. 62-134463

[51] Int. Cl.$^4$ ............................................. F16H 11/02
[52] U.S. Cl. ......................................... 474/28; 74/730
[58] Field of Search ...................... 474/18, 28, 11, 17, 474/70; 74/867–869, 730–733, 689

[56] References Cited

U.S. PATENT DOCUMENTS 4,478,105 10/1984 Yamamura et al. ................... 74/730
4,669,336 6/1987 Okada et al. ...................... 474/28 X

FOREIGN PATENT DOCUMENTS 0117264 5/1984 European Pat. Off. .............. 474/28
57-161360 10/1982 Japan .

Primary Examiner—Thuy M. Bui
Attorney, Agent, or Firm—Martin A. Farber

[57] ABSTRACT

A continuously variable transmission has a torque converter with a lockup clutch. A high pressure oil pump is provided adjacent the transmission and a low pressure oil pump is provided adjacent the torque converter. A line pressure control valve is provided for controlling the pressure of oil supplied from the high pressure oil pump to produce a line pressure for operating the transmission. A lockup control valve operated by low pressure oil supplied from the low pressure oil pump is provided for controlling the lockup clutch, and a solenoid operated valve is provided to generate a converter condition pressure for operating the lockup control valve, for operating the lockup clutch. The converter condition pressure is applied to the line pressure control valve so as to increase the line pressure.

11 Claims, 6 Drawing Sheets

SYSTEM FOR CONTROLLING THE PRESSURE OF OIL FOR A CONTINUOUSLY VARIABLE TRANSMISSION

BACKGROUND OF THE INVENTION

The present invention relates to a hydraulic control system for a continuously variable belt-drive automatic transmission for a motor vehicle having a torque converter provided with a lockup clutch, and more particularly to a system for controlling the lockup clutch and line pressure in a hydraulic circuit for the transmission.

In a continuously variable transmission provided with a torque converter, torque transmitted to the transmission is multiplied by the torque converter. On the other hand, when a lockup clutch provided in the torque converter is engaged, the engine torque is directly transmitted without multiplying. In order to prevent slipping of the belt on the pulleys, the line pressure which is controlled in dependency on the transmitted torque is regulated either for the lockup state or for the torque converter operating state.

Japanese Patent Laid Open 57-161360 (U.S. Pat. No. 4,478,105) discloses a system in which pressure of oil from an oil pump is adjusted by a line pressure control valve for controlling drive and driven pulleys of the transmission. The line pressure control valve produces a control pressure for controlling a torque converter, a lockup clutch, a lockup control valve, and a clutch for a selector device. As the pressure in a drive pulley cylinder increases after the starting of the changing of the transmission ratio, a release side oil chamber of the torque converter is drained to engage the lockup clutch. During the release of the lockup clutch, the pressure applied to the release side oil chamber is applied to the line pressure control valve to increase the line pressure.

However, in the control system, since the lockup clutch is controlled by the pressure applied to the drive pulley, the torque converter can be locked only after the start of the changing of the transmission ratio. Accordingly, when the rotational speed of the drive pulley is decreased, the lockup clutch is disengaged although the lockup of the torque converter may be preferable for the driving condition. Accordingly, the lockup range decreases. Additionally, the oil in the release side chamber is applied to the line pressure control valve in order to control the line pressure. However, the oil in the release side flows constantly, so that the pressure thereof is subject to vary. Thus, the line pressure cannot be increased with accuracy.

SUMMARY OF THE INVENTION

An object of the present invention is to provide a hydraulic control system where a lockup clutch of a torque converter is appropriately controlled.

Another object of the present invention is to accurately control the line pressure in accordance with the operating conditions of the torque converter.

The other objects and features of this invention will become understood from the following description with reference to the accompanying drawings.

DETAILED DESCRIPTION OF THE PREFERRED EMBODIMENT

Figure 1A:
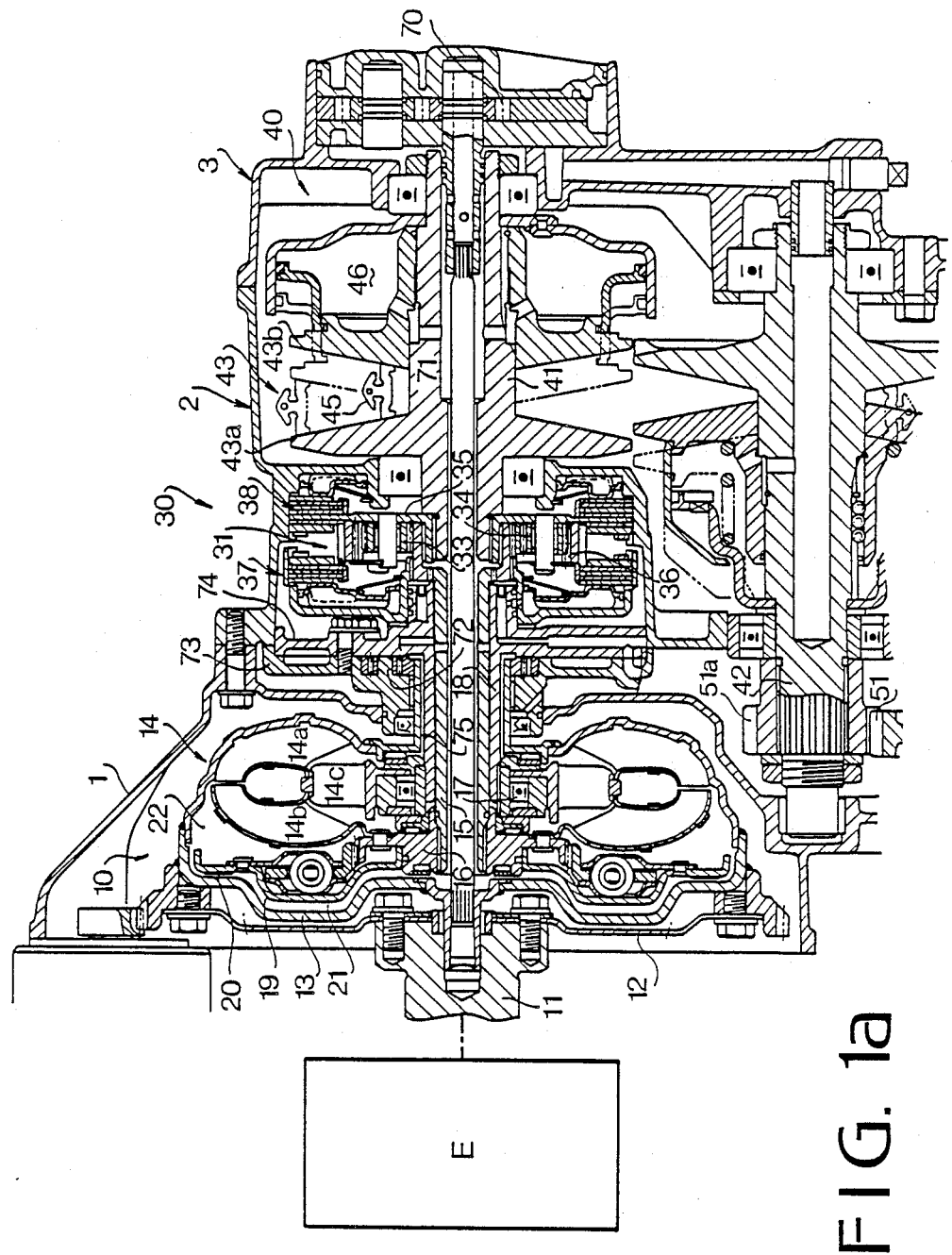
FIGS. 1a and 1b show a sectional view of a continuously variable belt-drive transmission to which the present invention is applied.
Figure 1B:
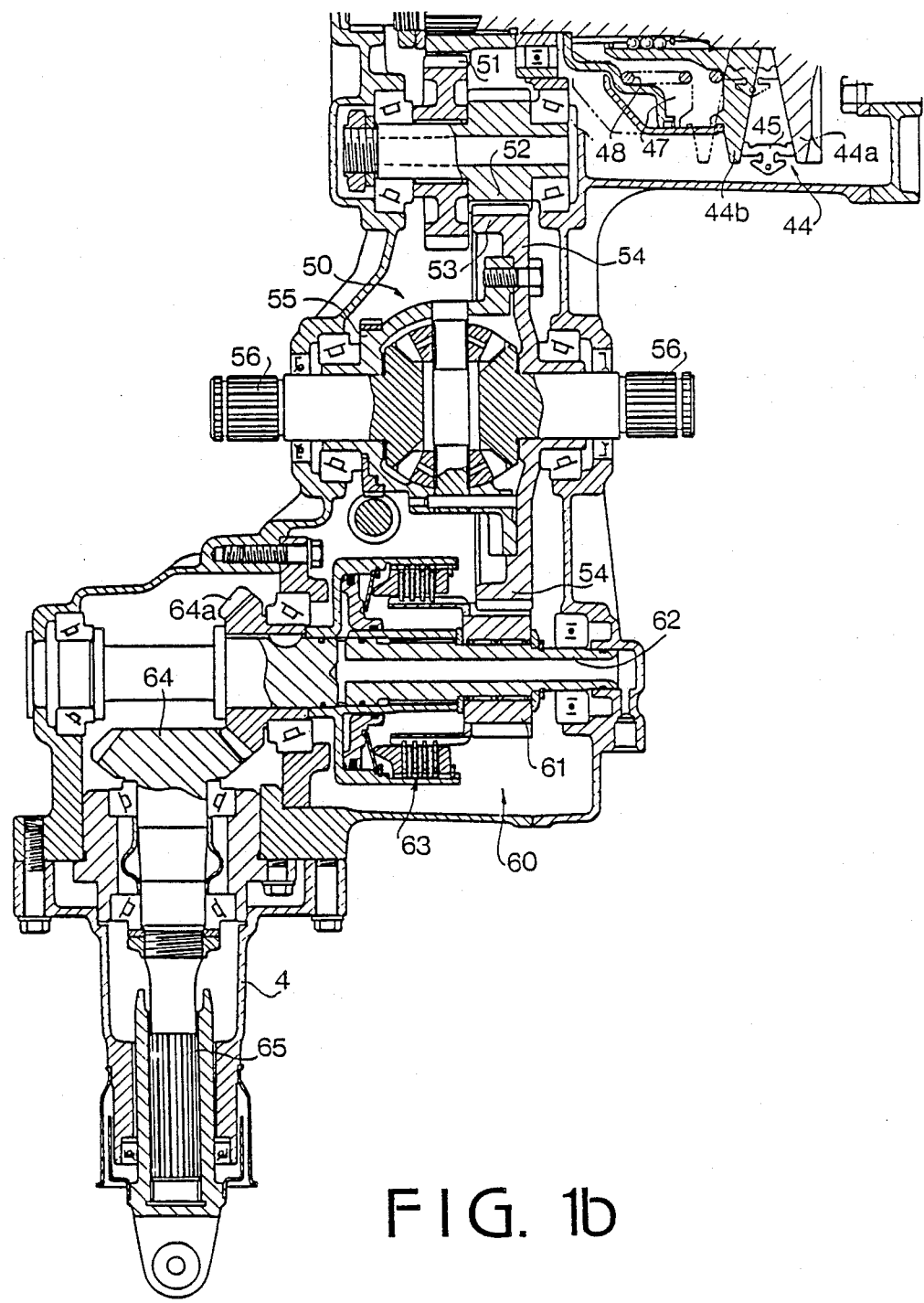

FIGS. 1a and 1b show a four-wheel drive power transmission system with a continuously variable belt-drive automatic transmission for a motor vehicle, to which the present invention is applied. An engine E is transversely mounted on a motor vehicle at a front portion thereof. The power transmission system comprises a torque converter device 10, a selector device 30, a continuously variable belt-drive transmission 40, a final reduction and differential device 50, and a transfer device 60. The torque converter device 10 is provided in a housing 1. The selector device 30, transmission 40, final reduction device 50 and transfer device 60 are provided in a main housing 2 and a side housing 3. An extension case 4 is secured to the housing 1.

The torque converter device 10 has a torque converter 14 with a lockup clutch 19. A drive plate 12 is fixed to a crankshaft 11 of the engine E. A converter cover 13 is secured to the drive plate 12. The torque converter 14 comprises an impeller 14a integral with the converter cover 13 by welding, a turbine 14b fixed to a turbine hub 16 which is splined to an input shaft 15, and a stator 14c connected to a hollow stator shaft 18 through a one-way clutch 17. The lockup clutch 19 is disposed between the converter cover 13 and the torque converter 14, and a facing 20 of the lockup clutch 19 is attached for making contact with the cover 13. Further, in the torque converter device 10, a release side oil chamber 21 is defined adjacent the converter cover 13 for applying release pressure to the lockup clutch 19, and an apply side oil chamber 22 is formed adjacent the torque converter 14 for applying lockup pressure to the lockup clutch 19.

The selector device 30 comprises a planetary gear 31 having a pair of pinions 33 and 34, and a sun gear 32 mounted on the input shaft 15. Pinions 33 and 34 are supported on a carrier 35. The sun gear 32 is engaged with a ring gear 36 through pinions 33 and 34. A forward clutch 37 is disposed between the sun gear 32 and the ring gear 36. A reverse brake 8 is disposed between the ring gear 36 and the main case 2. At forward driving such as during selection of a drive range (d), the forward clutch 37 is engaged to lock the sun gear 32. At reverse driving, the reverse brake 38 is engaged to lock the ring gear 36 for reversely rotating the carrier 35. If the number of teeth of the ring gear 36 is determined to be twice as many as that of the sun gear 32, the a gear ratio at the reverse driving is equal to that at the forward driving.

The belt-drive transmission 40 has a main shaft 41 engaged with the carrier 35 and an output shaft 42 provided in parallel with the main shaft 41. A drive pulley (primary pulley) 43 and a driven pulley (secondary pulley) 44 are mounted on the main shaft 41 and output shaft 42, respectively. A fixed conical disc 43a of the drive pulley 43 is integral with the main shaft 41 and an axially movable conical disc 43b is axially slidably mounted on the main shaft 41. The movable conical disc 43b also slides in a cylinder 46 formed on the main shaft 41 to provide a servo device.

A fixed conical disc 44a of the driven pulley 44 is formed on the output shaft 42 opposite the movable conical disc 43b and a movable conical disc 44b is slidably mounted on the shaft 42 opposite the disc 43a. The movable conical disc 44b has a cylindrical portion which is slidably engaged in a cylinder 47 of the output shaft 42 to form a servo device. A spring 48 is provided to urge the movable conical disc 44b toward the fixed conical disc 44a. A drive belt 45 engages with the drive pulley 43 and the driven pulley 44. The cylinder 46 of the drive pulley 43 is so designed that the pressure receiving area thereof is larger than that of the cylinder 47 of the driven pulley 44. Thus, the running diameter of the belt 45 on the pulleys is varied dependent on driving conditions.

Secured to the output shaft 42 is a drive gear 51a of the final reduction device 50 which engages with an intermediate reduction gear 51 on an intermediate shaft 52. An intermediate gear 53 on the shaft 52 engages with a final reduction gear 54. The rotation of the final reduction gear 54 is transmitted to axles 56 of front driving wheels of the vehicle through a differential 55.

The transfer device 60 comprises a transfer gear 61 engaged with the final reduction gear 54 and rotatably mounted on a transfer shaft 62 which is transversely disposed and rotatably supported by bearings, and a transfer clutch 63 in the form of a fluid operated multiple-disk friction clutch. The transfer clutch 63 operates to couple the gear 61 with the shaft 62, so that the rotation of the gear 61 is transferred to rear drive wheels of the vehicle through shaft 62, bevel gear 64a secured to the shaft 62, bevel gear 64 engaged with the bevel gear 64a and rear drive shaft 65.

In the side housing 3, an oil pump 70 is provided for supplying a high pressure of oil for the transmission. The main shaft 41 has an axial passage in which an oil pump driving shaft 71 connected to the crankshaft 11 is rotatably mounted. An oil pump 72 for the torque converter device 10 is provided for supplying a low pressure of oil and housed in a pump housing 73 and a cover 74 at the rear end of the housing 1. A pump drive shaft 75 is connected to the impeller 14a and is operatively connected with a rotor of the oil pump 72.

Thus, the oil pump 70 is disposed adjacent the transmission 40, and the oil pump 72 is disposed adjacent the torque converter device 10.

Figure 2A:
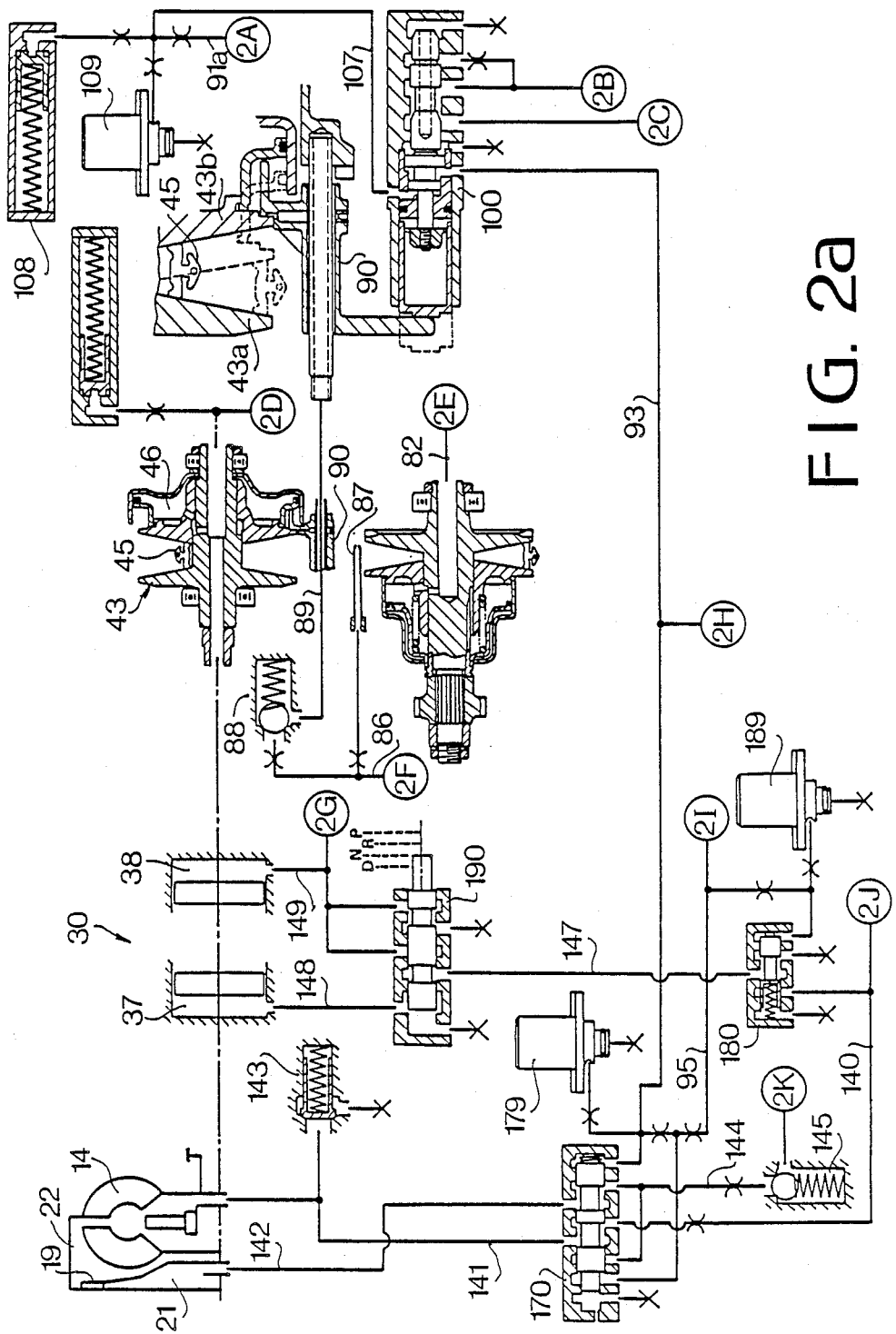
FIGS. 2a and 2b show a hydraulic control circuit according to the present invention.
Figure 2B:
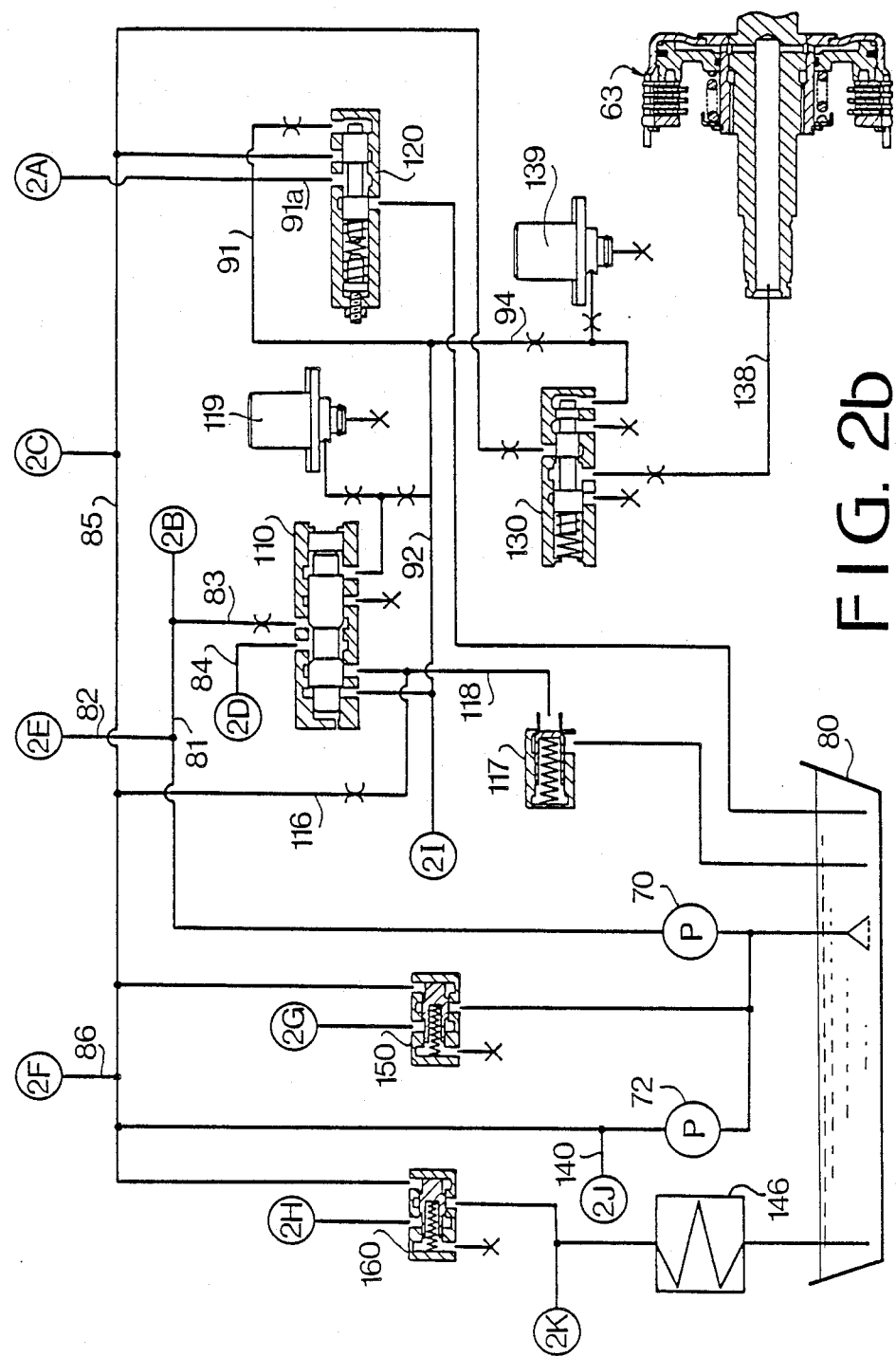

Referring to FIGS. 2a and 2b, showing a hydraulic control circuit, oil in an oil reservoir 80 is supplied to a line pressure control valve 100 through a line pressure passage 81 by the pump 70. An oil passage 82 connected to the passage 81 is communicated with the cylinder 47 of the driven pulley 44. The passage 81 is further communicated with a transmission ratio control valve 110 through a passage 83. The cylinder 46 of drive pulley 43 is applied with pressurized oil passing through the passage 81, passage 83, transmission ratio control valve 110, and a passage 84.

A passage 140 connected to the oil pump 72 is communicated with a passage 85. The pressure of oil supplied to the passage 85 is regulated by a pair of relief valves 150 and 160 to produce a low actuating pressure. The passage 85 is connected to a drain port of the line pressure control valve 100.

A part of the oil in the passage 85 is supplied to the driven pulley 44 from a nozzle 87 passing through a passage 86 to lubricate the pulley device. The passage 86 is further communicated with a passage 89 through a check valve 88. The passage 89 is communicated with a lubricating oil tube on which a transmission ratio sensing shoe 90 is slidably mounted.

The passage 85 is communicated with a reducing valve 120 for providing a constant reducing pressure of oil. A conduit 91a is communicated with the line pressure control valve 100 through a passage 107. The conduit 91a is also communicated with a solenoid operated on-off valve 109 and with an accumulator 108. Further, a conduit 91 is communicated with the transmission ratio control valve 110 through a passage 92 and with a solenoid operated on-off valve 119.

The solenoid operated valve 109 is adapted to be operated by duty signals for producing control pressure in the form of pulses and the control pressure is applied to the line pressure control valve 100. Further, the line pressure control valve 100 is applied with signals dependent on the transmission ratio from the sensing shoe 90 and on oil pressure through a passage 93 in accordance with conditions of the torque converter, so that the line pressure is controlled in accordance with the transmission ratio, engine torque, and torque multiplying factor of the torque converter.

The solenoid operated valve 119 is also operated by duty signals and produces control pressure which is applied to the transmission ratio control valve 110 for shifting a spool of the valve 110 to an oil supply position and an oil drain position by the degree of duty cycle. The control pressure increases upon off state of the duty signal and reduces on state of the duty signal. Thus, the flow rate of oil supplied to or drained from the cylinder 46 of drive pulley 43 is controlled to provide optimum transmission ratio.

A drain passage 118 from the transmission ratio control valve 110 is communicated with the oil reservoir 80 through a check valve 117. A prefill passage 116 is provided between the passage 85 and a position upstream of the check valve 117. Thus, oil is supplied to the cylinder 46 of the drive pulley 43, even if the transmission ratio control valve 110 is in the drain state, thereby improving starting characteristic.

The passage 85 is communicated with the transfer control valve 130, and a solenoid operated valve 139 for the transfer control valve 130 is communicated with the reducing valve 120 through a passage 94. The solenoid operated valve 139 actuates the transfer control valve 130 to produce clutch actuating pressure which is supplied to the transfer clutch 63 through a passage 138 for controlling clutch torque dependent on driving conditions.

The passage 140 is communicated with the lockup control valve 170. The lockup control valve 170 is communicated with the torque converter 14 through a passage 141 and the release side oil chamber 21 of the lockup clutch 19 through a passage 142. A relief valve 143 is provided on the passage 141 for preventing increase of pressure in the torque converter 14 when the torque converter is locked up. A drain passage 144 of the lockup control valve 170 is communicated with the oil reservoir 80 through a check valve 145 and an oil cooler 146. The lockup control valve 170 is communicated with the reducing valve 120 through passages 95, 92 and 91 for supplying with the reducing pressure as a controlled oil pressure to the lockup control valve 170. The reducing pressure is also supplied to the passage 93 communicated with the line pressure control valve 100 and to a solenoid operated on-off valve 179. The solenoid operated valve 179 controls the controlled oil pressure so as to produce converter condition pressure $P_R$ in the passage 93 operate the lockup control valve 170 to communicate the passage 140 with the passage 141 or the passage 142.

The passage 140 is further communicated with a safety lock valve 180 which is connected to a selector valve 190 through a passage 147. The selector valve 190 is provided for selectively connecting passages in accordance with operations of a selector lever for selecting operational ranges such as a parking range (P), reverse range (R), neutral range (N), and drive range (D). The selector valve 190 is communicated with the forward clutch 37 through a passage 148 and with the reverse brake 38 through a passage 149.

The safety lock valve 180 has a solenoid operated on-off valve 189 which is supplied with the reducing pressure of the reducing valve 120 through passage 95 to forcibly drain the oil in the forward clutch 37 or the reverse brake 38 to disengage the transmission.

Figure 3A:
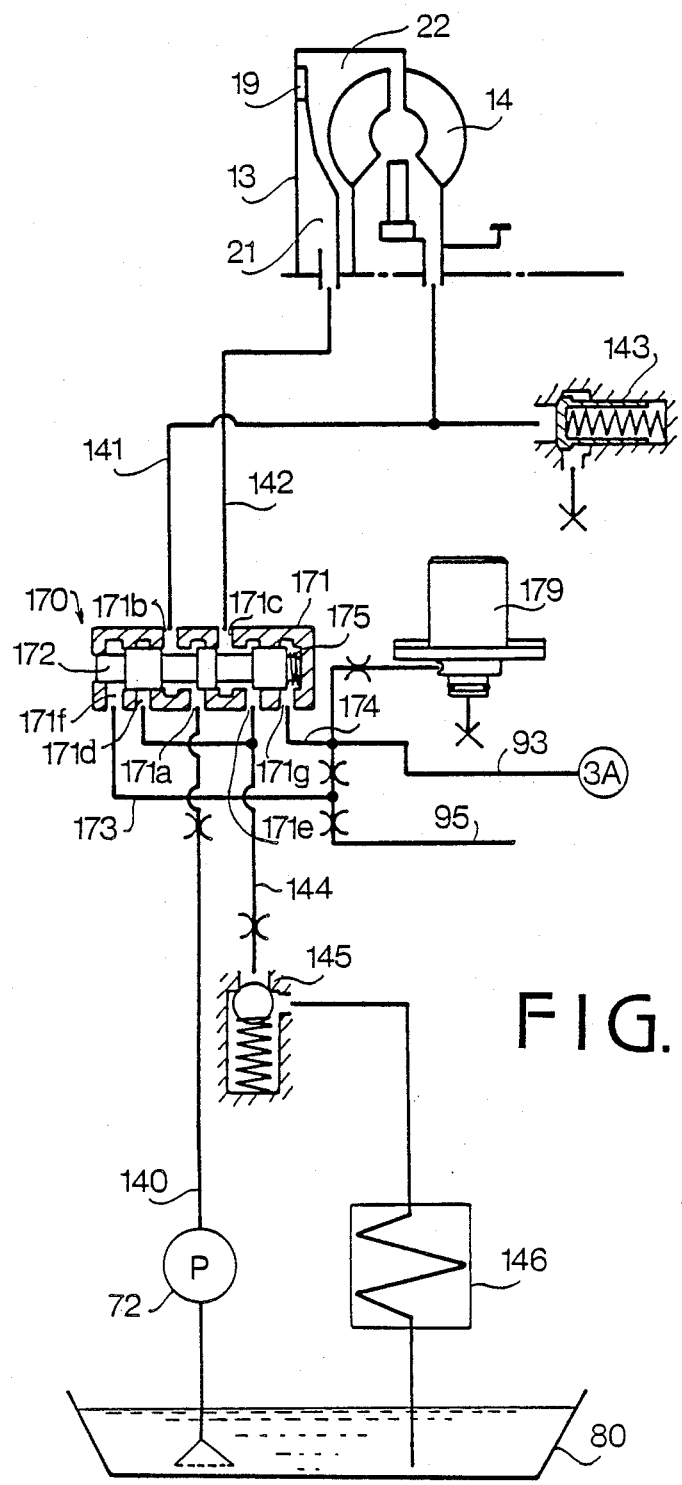
FIGS. 3a and 3b show a main portion of the hydraulic circuit.
Figure 3B:
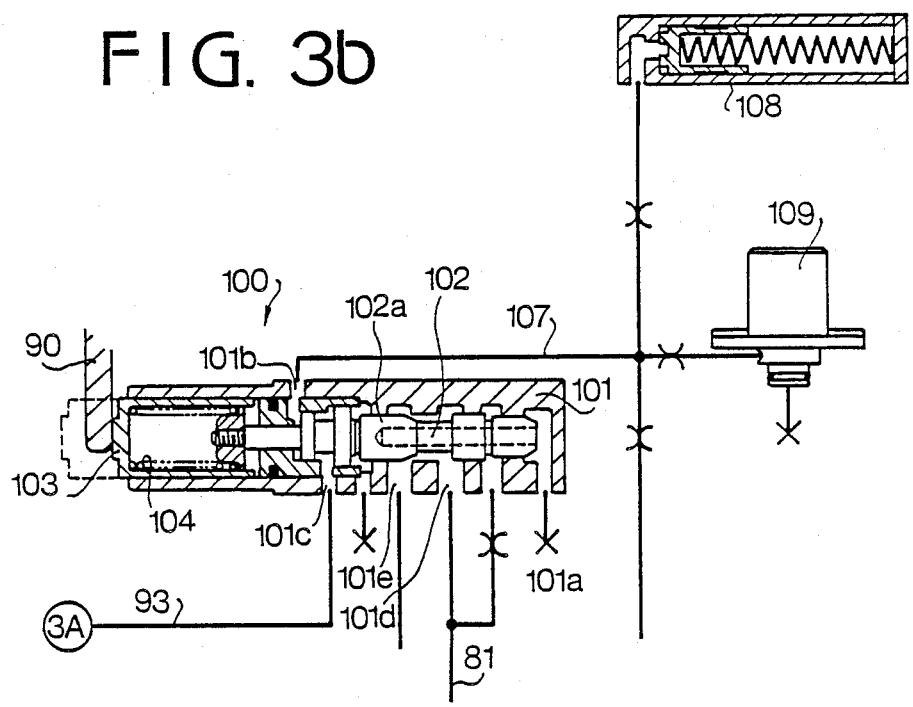

The lockup control valve 170 and the line pressure control valve 100 are described in detail with reference to FIG. 3.

The lockup control valve 170 comprises a valve body 171, a spool 172 and a spring 175 for urging the spool to the left. A port 171a which is communicated with the passage 140 is selectively communicated with a port 171b or a port 171c in accordance with the position of lands of spool 172. The ports 171b and 171c communicate with the passages 141 and the passage 142, respectively. Drain ports 171d and 171e, each communicated with the drain passage 144, are provided to selectively communicate with the ports 171b or 171c, respectively. An end chamber 171f and an end chamber 171g formed at opposite ends of the spool are communicated with the oil passage 95 through passages 173 and 174, respectively, so as to be applied with the reducing pressure from the reducing valve 120. The chamber 171g is also communicated with the solenoid operated on-off valve 79 and with the passage 93 communicated with the line pressure control valve 100. The spool 172 is so designed that a pressure receiving area thereof is smaller at the chamber 171f than at the chamber 171g. Accordingly, when the reducing pressure is equally applied to both chambers through the passage 95, the spool 172 is shifted to the left by the large pressure applied to the chamber 171g.

The solenoid operated on-off valve 179 is provided to be turned off to drain the oil. When the valve 179 is turned on to close the valve, the reducing pressure is applied to the end chamber 171g so that the spool 172 is shifted to the left, thereby communicating the port 171a with the port 171c. Accordingly, the pressurized oil is supplied to the torque converter 14 through the passages 140, 142 and the release side oil chamber 21. The port 171b is communicated with the drain port 171d so that the oil in the torque converter 14 is drained to the oil reservoir 80 through the passage 141, 144 and the oil cooler 146. Accordingly, the lockup clutch 19 is released so that torque converter 14 is operated to multiply the torque.

On the other hand, when the solenoid operated valve 179 is turned off to open the valve, the oil in the chamber 171g is drained. The spool 172 is shifted to the right to the position shown in FIG. 3. Thus, the port 171a is communicated with the port 171b and the port 171c is communicated with the port 171e, thereby supplying oil to the apply side oil chamber 22 through the passage 141, and draining the oil in the release side oil chamber 21 of the lockup clutch 19 through the passage 142. Accordingly, the facing 20 comes in contact with the converter cover 13 to engage the lockup clutch 19. The relief valve 143 in the passage 141 maintains the pressure of oil in the torque converter 14 while the clutch is locked.

When the solenoid operated valve 179 is closed, the reducing pressure is applied to the line pressure control valve 100 through the passage 93 as a converter condition pressure.

The line pressure control valve 100 comprises a valve body 101, spool 102, and ports 101a, 101b, 101c, 101d and 101e. The line pressure control valve 100 has an axially slidable spring retainer 103 and a spring 104 provided between the spool 102 and the retainer 103. The transmission ratio sensing shoe 90 engages with the retainer 103.

The ports 101a and 101d are supplied with the pressurized oil through the line pressure passage 81 from the pump 70. A land 102a of the spool 102 is arranged to control the communication between the port 101d and the drain port 101e to as to control the line pressure. The port 101c is applied with the reducing pressure (converter condition pressure) $P_R$ representing the operating condition of the torque converter through the passage 93, and the port 101b is applied with an actuating pressure $P_C$ determined by the solenoid operated valve 109.

In the line pressure control valve 100, the relationship among spring load F, line pressure $P_L$, actuating pressure $P_C$ at the port 101b, reducing pressure $P_R$, line pressure receiving area $S_L$ of the spool at the port 101a, actuating pressure receiving area $S_C$ at the port 101b and reducing pressure receiving area $S_R$ at the port 101c is as follows.

$$P_L \cdot S_L = P_C \cdot S_C + P_R \cdot S_R + F$$

Figure 4:
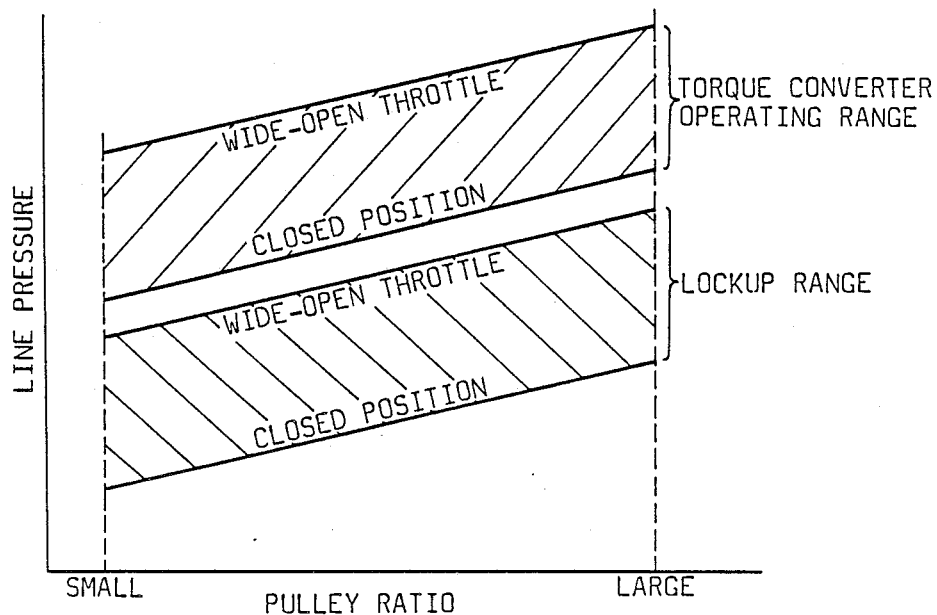
FIG. 4 is a graph showing line pressure characteristic.

When the lockup clutch 19 of the torque converter is engaged, since the solenoid operated valve 179 is open, the reducing pressure is not applied to the port 101c of the line pressure control valve ($P_R = 0$). Accordingly, the line pressure is controlled in accordance with the spring force F which is dependent on the transmission ratio and the actuating pressure $P_C$ which is dependent on the engine power. Thus, as shown in the graph of FIG. 4, the line pressure increases as the opening degree of the throttle valve increases and decreases as the transmission is upshifted (small transmission pulley ratio). On the other hand, when the torque converter 14 is operated, the reducing pressure $P_R$ (as converter condition pressure) is applied to the port 101c, thereby increasing the line pressure $P_L$. Therefore, the line pressure $P_L$ in the torque converter operating range becomes larger than in the lockup range as shown in FIG. 4 so as to prevent the belt from slipping on the pulleys.

Describing the operation of the system, the system supplies pulse signals to the solenoid operated valves 109, 119, 139, 179 and 189 to operate them at duty cycles dependent on driving conditions. When the engine starts, the oil pumps 70 and 72 are driven to supply oil to the system. The high line pressure is supplied by the oil pump 70 to the passage 81 and controlled by the line pressure control valve 100. The cylinder 47 of the driven pulley 44 is supplied with the line pressure adjusted by the line pressure control valve 100 through the passages 81, 82. Thus, the continuously variable transmission 40 provides the largest transmission ratio at low engine speed stage.

On the other hand, a low actuating pressure of oil adjusted by the relief valves 150 and 160 is supplied to passages 140 and 85. From the low actuating pressure, the reducing valve 120 produces a reducing pressure which is applied to solenoid operated valves 119, 139, 179 and 189. The low actuating pressure is supplied to the transfer control valve 130 through the passage 85 to produce the clutch actuating pressure which is supplied to the transfer clutch 63. The actuating pressure is also supplied to the lockup control valve 170 through the passage 140. At starting of the vehicle, the passage 140 is communicated with the passage 142 by the operation of the solenoid operated valve 179. Thus, the pressure of oil is applied to the torque converter 14 through the release side oil chamber 21 and drained to the oil reservoir 80 through the passages 141 and 144. The lockup clutch 19 is disengaged and the torque converter 14 is in operating state. In a normal state, the safety lock valve 180 operates to communicate the passage 140 with the passage 147 by the solenoid operated valve 189, so that the selector valve 190 is supplied with the actuating pressure.

When the P or N range is selected at starting, oil in the forward clutch 37 and the reverse brake 38 are drained. Thus, the planetary gear 31 is released to disengage the transmission 40.

When the D range is selected, the actuating pressure is applied to the forward clutch 37 to lock the planetary gear 31, so that the input shaft 15 is engaged with the main shaft 41. Thus, the torque converter 14 operates to transmit the power of the engine to the automatic transmission 40. The power of the engine is transmitted to the output shaft 42 at the largest transmission ratio by the driving belt 45 and pulleys 43, 44, and further transmitted to axles of the driving wheels through the final reduction device 50. Thus, the vehicle is started.

In this state, converter condition pressure $P_R$ is supplied to the line pressure control valve 100 by the operation of the lockup solenoid 179 through the passage 93 to increase the line pressure. The torque converter 14 multiplies the torque in accordance with the speed, and the multiplied torque is transmitted through the transmission 40 without slipping of the belt 45 due to the high line pressure.

After starting of the vehicle, when the torque converter 14 becomes a condition for a lockup range, and the solenoid operated valve 179 is turned off, the oil in the release side chamber 21 is drained through the passage 142 so that lockup clutch 19 is pushed by the oil pressure in the apply side chamber 22. Thus, the facing 20 comes in contact with the converter cover 13 to lock the crankshaft 11 and the lockup clutch 19, which means locking of the torque converter 14. Therefore, the engine power can be transmitted to the input shaft 15 through the lockup clutch 19.

In this state, converter pressure in the passage 93 becomes zero, so that the line pressure is controlled by the line pressure control valve 100 without the torque multiplying factor, thereby preventing the line pressure supplied to the pulleys from exceeding. The transmission ratio control valve 110 is operated by solenoid valve 119, for controlling the pressure applied to the cylinder 46 of the drive pulley 43. Thus, the transmission ratio is controlled at a predetermined transmission ratio changing speed.

When the R range is selected, the reverse brake 38 is supplied with the actuating pressure of oil to reversely rotate the carrier 35 for providing reverse driving.

In order to prevent a shock which occurs when the torque converter 14 is locked, the solenoid operated valve 179 may be modified so as to be operated dependent on a duty cycle, thereby gradually increasing the actuating pressure applied to the apply side chamber 22. In the modification, an additional solenoid operated on-off valve is further provided between the passages 93 and 95 for controlling the reducing pressure (converter condition pressure) $P_R$ applied to the line pressure control valve 100.

In another modification, a check valve and an orifice may be provided in the passage 93 so as to decrease the flow rate of the oil to the line pressure control valve 100. Thus, a shock which occurs at the increase of the line pressure when the transmission is downshifted can be restrained.

In accordance with the present invention, the lockup clutch of the torque converter is operated by the solenoid operated valve so that the clutch is locked without delay at appropriate driving conditions, for example at the start of the changing of the transmission ratio. Thus, the lockup of the torque converter is effectively performed. Since a predetermined reducing pressure is applied to the line pressure control valve as a converter condition pressure, the line pressure can be accurately increased in accordance with the increase of the torque by the torque converter. The supply of the reducing pressure to the line pressure control valve is easily controlled by the solenoid operated valve without response delay. Since hydraulic circuits supplying different levels of oil pressure are respectively provided for the transmission and the torque converter, the control thereof is performed without affecting each other.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A system for controlling pressure of oil for a continuously variable transmission for transmitting power of an engine to wheels of a vehicle, the system having a first hydraulic circuit including a transmission ratio control valve for controlling the transmission and a line pressure control valve, and a torque converter with a lockup clutch operatively connected between the engine and the transmission, the system comprising:
   a high pressure oil pump for supplying oil to the transmission;
   a low pressure oil pump for supplying oil to the torque converter,
   both of the oil pumps being operatively connected to the engine to be driven by the engine;
   the line pressure control valve being provided to be operated in accordance with driving conditions of the vehicle, for controlling the pressure of oil supplied from the high pressure oil pump to produce a line pressure for operating the transmission;
   a second hydraulic circuit provided for supplying the oil from the low pressure oil pump to the torque converter and to the lockup clutch;
   a lockup control valve provided in the second hydraulic circuit for controlling the oil supplied to the lockup clutch;
   valve means for regulating the pressure of the oil from the low pressure oil pump, producing a controlled oil pressure for operating the lockup control valve;

a solenoid operated valve provided for controlling the controlled oil pressure to generate a converter condition pressure in a converter operating range of the torque converter for operating the lockup control valve so as to release the lockup clutch, and respectively, to generate a lockup pressure in a lockup range of the torque converter for operating the lockup control valve in reverse so as to lock the lockup clutch; and a third hydraulic circuit for applying the converter condition pressure to the line pressure control valve so as to increase the line pressure.

2. The system according to claim 1, wherein the valve means is a reducing valve producing a reducing pressure having a constant value.

3. The system according to claim 1, wherein said lockup pressure is zero.

4. The system according to claim 1, wherein said solenoid operated valve is operable dependent on a duty cycle so as to operate the lockup control valve in reverse so as to gradually increase actuating pressure applied to an apply side of the lockup clutch for locking the lockup clutch.

5. The system according to claim 4, further comprising an additional solenoid operated valve disposed between said valve means and said third hydraulic circuit for controlling the converter condition pressure applied to said line pressure control valve.

6. The system according to claim 1, further comprising an additional solenoid operated valve disposed between said valve means and said third hydraulic circuit for controlling the converter condition pressure applied to said line pressure control valve.

7. The system according to claim 1, wherein said third hydraulic circuit includes a check valve having an orifice provided so as to decrease flow rate of the oil having the converter condition pressure applied to said line pressure control valve, whereby shock which occurs during increase of the line pressure when the transmission is downshifted can be restrained.

8. The system according to claim 1, wherein said torque converter multiplies torque, which is transmitted through said transmission, in dependency on the converter condition pressure via operation of the lockup control valve in reverse, the converter condition pressure applied to said line pressure control valve thereby being dependent on the multiplied torque, and the line pressure control valve is arranged to increase the line pressure in dependency on the multiplied torque.

9. The system according to claim 1, wherein said lockup control valve comprises a displaceable spool.

10. The system according to claim 1, wherein said line pressure control valve is controlled so as to increase the line pressure as a throttle valve of the engine opens and as the transmission is downshifted in said lockup range, and respectively, in said converter operating range of the torque converter.

11. The system according to claim 10, wherein said line pressure control valve is controlled so as to increase the line pressure to greater values in said converter operating range than in said lockup range at corresponding conditions of the throttle valve and the transmission.

* * * * *